United States Patent

Iga

[11] Patent Number: 5,119,919
[45] Date of Patent: Jun. 9, 1992

[54] OVERRUNNING CLUTCH FOR PREVENTING "DANCING PHENOMENON"

[75] Inventor: Kazuo Iga, Yamatotakada, Japan

[73] Assignee: Koyo Seiko Co., Ltd., Osaka, Japan

[21] Appl. No.: 737,483

[22] Filed: Jul. 30, 1991

[30] Foreign Application Priority Data

Aug. 3, 1990 [JP] Japan ................ 2-83078[U]

[51] Int. Cl.$^5$ ............................ F16D 41/06
[52] U.S. Cl. .................................... 192/45
[58] Field of Search ............ 192/41 R, 42, 45

[56] References Cited

U.S. PATENT DOCUMENTS

| | | | |
|---|---|---|---|
| 2,245,431 | 6/1941 | Critchfield | 192/45 |
| 2,902,125 | 9/1959 | House et al. | 192/45 |
| 3,537,555 | 11/1970 | Herzpgenaurach | 192/45 |
| 3,972,573 | 8/1976 | Marola | 192/45 |
| 4,178,805 | 12/1979 | Mazzorana | 192/45 X |
| 4,236,619 | 12/1980 | Kuroda | 192/45 |
| 4,566,567 | 1/1986 | Miyatake | 192/45 |
| 4,735,299 | 4/1988 | Ohuchi | 192/45 |
| 4,754,859 | 7/1988 | Ohuchi et al. | 192/45 |
| 4,821,856 | 4/1989 | Lederman | 192/45 |
| 4,838,398 | 6/1989 | Lederman | 192/45 |
| 4,895,234 | 1/1990 | Fujino | 192/42 |

FOREIGN PATENT DOCUMENTS 2225394 12/1973 Fed. Rep. of Germany ........ 192/45

*Primary Examiner*—Leslie A. Braun
*Assistant Examiner*—Nicholas Whitelaw

[57] ABSTRACT

An overrunning clutch has a drive shaft, a driven shaft coaxial with the drive shaft and a cylindrical body secured to and coaxial with the driven shaft. The cylindrical body is arranged to surround a transmission section of the drive shaft and includes a plurality of cam surfaces formed in its inner peripheral surface. The cylindrical body acts as an overrunning clutch. Recesses are radially formed in the corresponding cam surfaces and adapted to hold rollers against the action of spring. A retainer is held within the cylindrical body and includes a plurality of roller pockets corresponding to the cam surfaces, a plurality of rollers rollingly disposed within the roller pockets and contactable with the inner peripheral surface of the cylindrical body and the peripheral surface of the transmission section of the drive shaft, and springs disposed within the roller pockets and adapted to urge the rollers in the direction in which the rollers are locked in the cam surfaces. The overrunning clutch is designed to firmly hold the rollers in such a position that they can race and to eliminate "dancing phenomenon" of the rollers.

3 Claims, 5 Drawing Sheets

OVERRUNNING CLUTCH FOR PREVENTING "DANCING PHENOMENON"

BACKGROUND OF THE INVENTION

The present invention relates to an overrunning clutch for use, for example, in the engine starter of an agricultural machine (lawn mower or sprayer).

FIG. 5 is a side view, in longitudinal section, of a conventional transmission system disposed between a starter motor and a crankshaft and including an overrunning clutch.

Referring to FIG. 5, numeral 52 is a starter motor. A drive gear 54 is mounted on the output shaft of the starter motor 52. An idle gearing 56 has a large gear 56a and a small gear 56b are integral together. Numeral 58 is a reduction gear. Numeral 60 is a transmission sleeve or cylindrical body on which the reduction gear 58 is fixedly mounted. The large gear 56a and the small gear 56b in the idle gearing 56 are meshed with the drive gear 54 and the reduction gear 58, respectively. With this arrangement, power is transmitted from the starter motor 52 to the transmission sleeve 60 with the speed of rotation of the starter motor 52 being reduced through the gears.

The sleeve 60 is fit coaxially around the crankshaft 62. A shell-type overrunning clutch 64 is disposed between the sleeve 60 and the crankshaft 62. As shown in FIGS. 6 and 7, the overrunning clutch 64 includes an outer member or shell 66, a retainer 68, and a plurality of rollers 70. The shell 66 has a cylindrical portion 66a, and a pair of flanges 66b extending radially and inwardly from opposite ends of the cylindrical portion 66a. Cam surfaces 66c are formed in the inner peripheral surface of the cylindrical portion 66a and correspond in number with the rollers 70. The retainer 68 is made of synthetic resin and includes a pair of opposite annular rings 68a and 68a, and a plurality of column portions 68b axially extending between the rings 68a. A plurality of roller pockets 68c are defined between adjacent column portions 68b. The rollers 70 are rollingly disposed within the corresponding roller pockets 68c.

Each column portion 68b in the retainer 68 has an integral spring 68d. The spring 68d takes the shape of a bifurcated tongue adapted to urge the roller 70 in the roller pocket 68b in the direction in which the roller 70 is locked between the cam surfaced 66c and the crankshaft 62.

The shell 66 of the overrunning clutch 64 thus far constructed is press fit in the sleeve 60.

Operation is as follows.

To start up an engine, the starter motor 52 is first energized to rotate the sleeve 60 in the direction of an arrow $a_2$ through the drive gear 54, the idle gearing 56, and the reduction gear 58. This causes the shell 66 and the retainer 68 to rotate in the same direction. The rollers 70 urged by the springs 68d are then moved in the direction in which the space between the cam surfaces 66c and the crankshaft 62 are narrower. After the rollers have finally been locked between the cam surfaces 66c and the crankshaft 62, rotation of the shell 66 is transmitted through the rollers 70 to the crankshaft 62. The crankshaft 62 is then rotated in the direction of an arrow $b_2$ so as to start up the engine.

The starter motor 52 is stopped when the engine has been started. However, the crankshaft 62 is rotated at a higher speed in the direction of the arrow $b_2$ by means of the engine. At this time, the sleeve 60 is stopped as it is connected through the reduction gear 58, the idle gearing 56, and the drive gear 54 to the starter motor 52 now stopped. The shell 66 and the retainer 68 are also stopped as the shell is secured to the sleeve 60. A frictional force is applied from the crankshaft 62 to the rollers 70 to move the rollers 70 within the roller pockets 68c in the direction of the arrow $b_2$. The rollers 70 are moved in the direction in which the space between the cam surfaces 66c and the crankshaft 62 are wider, against the action of the tongue-like springs 68d. The rollers 70 are freely rolled in the space and separated from the cam surfaces 66c and the crankshaft 62. As a result, power is no longer transmitted from the crankshaft 62 to the shell 66 and thus, the starter motor 52.

It has been stated that when the crankshaft 62 is driven for rotation by the engine, the rollers 70 are moved in the direction in which the space between the cam surfaces 66c and the crankshaft 62 are narrower and is then free to race in the wide space. Although the rollers 70 move in that direction immediately after they come into contact with the crankshaft 62, they are moved in the direction in which the space between the cam surfaces 66c and the crankshaft 62 are narrower as soon as they race, and a pushing force is no longer applied from the crankshaft 62. This is because the springs 68d always urge the rollers 70 in the direction in which the space is narrower. Thereafter, the rollers are brought into contact with the crankshaft 62 and again, moved in the direction in which the space is wider. The rollers 70 are contacted with and separated from the crankshaft 62 in an intermittent manner. This is called a "dancing phenomenon". When the rollers 70 are moved in the direction in which the rollers 70 are locked, they become worn and hot due to friction. This also prevents smooth rotation of the crankshaft 62. Frictional heat results in an increase in the temperature of the rollers 70, the crankshaft 62 and the retainer 68. Seizing may occur when the temperature of these components is raised above a predetermined level.

If seizing occurs, the crankshaft 62 and the shell 66 are locked to give an impact to or to cause damage to the transmission system.

The retainer 68 is easily damaged due to frictional heat, particularly in the case that the retainer 68 with the springs 68d is made of synthetic resin.

Each roller 70 can be held in such a position that it races if the spring 68 has a smaller biasing force. However, such a smaller biasing force fails to firmly lock the roller 70 and to transmit rotation from the sleeve 60 to the crankshaft 62 when the engine is to be started up.

SUMMARY OF THE INVENTION

In view of the foregoing, it is an object of the present invention to provide an overrunning clutch which allows rollers to be firmly held in such a position that they can race, and eliminated "dancing phenomenon" of the rollers.

Another object of the present invention is to provide an overrunning clutch which prevents seizing of the rollers due to frictional heat and is highly durable, and which prevents damage to a transmission system.

A further object of the present invention is to provide an overrunning clutch which allows the use of a retainer and associated springs made of synthetic resin by minimizing frictional heat.

A still further object of the present invention is to provide an improved overrunning clutch which allows the use of springs disposed within roller pockets and capable of providing a sufficient biasing force to firmly lock the rollers.

In order to achieve these objects, there is provided an overrunning clutch comprising a drive shaft, a driven shaft coaxial with the drive shaft, a cylindrical body secured to and coaxial with the driven shaft, the cylindrical body being arranged to surround a transmission section of the drive shaft and including a plurality of cam surfaces formed in its inner peripheral surface and adapted to function as an overrunning clutch, recesses radially formed in the corresponding cam surfaces and adapted to hold rollers against the action of springs, a retainer held within the cylindrical body and having a plurality of roller pockets corresponding to the cam surfaces, a plurality of rollers rollingly disposed within the roller pockets and contactable with the inner peripheral surface of the cylindrical body and the peripheral surface of the transmission section of the drive shaft, and springs disposed within the roller pockets and adapted to urge the rollers in the direction in which the rollers are locked in the cam surfaces.

With this arrangement, when the driven shaft is rotated to cause the cylindrical body and the retainer to rotate together, a centrifugal force is applied to the rollers held within the roller pockets of the retainer. The rollers are then urged against the cam surfaces. A component is applied to the rollers along the cam surfaces so as to move the rollers toward the recesses against the action of the springs. The rollers are then received in the recesses and held in position regardless of an increase in the biasing force of the springs. The rollers are separated from the outer peripheral surface of the drive shaft and are free to race in the space.

Each roller is held at opposite edges or two points of the recess since the recess has a radius of curvature smaller than the radius of the roller. This ensures firm holding of the rollers in the recesses.

The retainer is made of synthetic resin. Preferably, the springs are integrally formed with the retainer to facilitate assembly. According to the present invention, the rollers are safely spaced apart from the outer peripheral surface of the drive shaft and are free to race in the space as mentioned earlier. This eliminates frictional heat and allows the use of components made of synthetic resin.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a side view, in longitudinal section, of an overrunning clutch;

FIG. 2 is a sectional view taken along the line II—II in FIG. 1;

FIG. 3 is an enlarged sectional view showing the principal part of the overrunning clutch in use;

FIG. 4 is a side view, in longitudinal section of a transmission system, together with the overrunning clutch, disposed between a starter motor and a crankshaft;

FIG. 5 is a side view, in longitudinal section, of a conventional transmission system, together with a conventional overrunning clutch, disposed between a starter motor and a crankshaft;

FIG. 6 is a side view, in longitudinal section, of the prior art overrunning clutch; and FIG. 7 is a sectional view taken along the line VII—VII in FIG. 6.

DESCRIPTION OF THE PREFERRED EMBODIMENT

The present invention will now be described, by way of example, with reference to the accompanying drawings.

Figure 4:
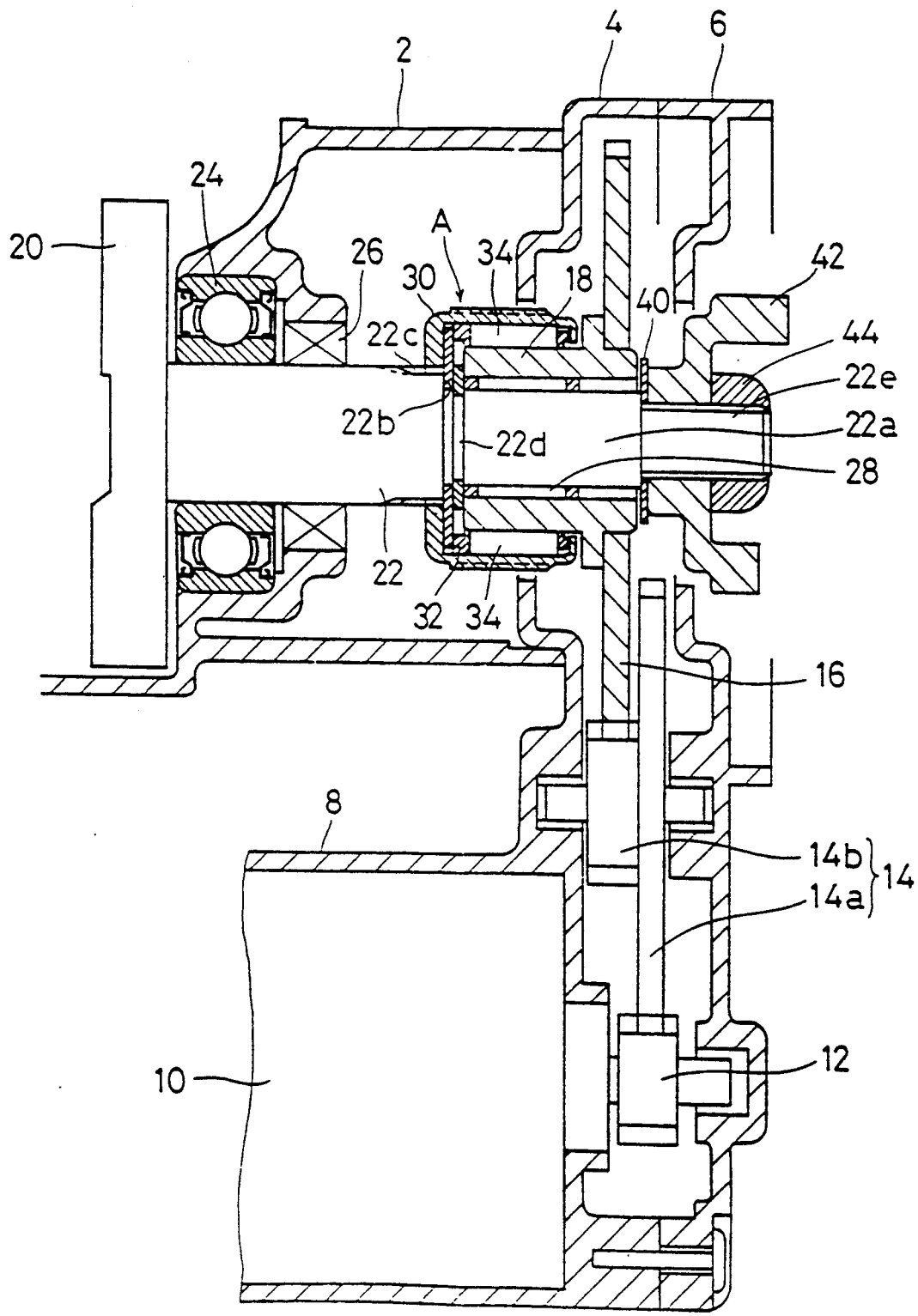
Figure 5:
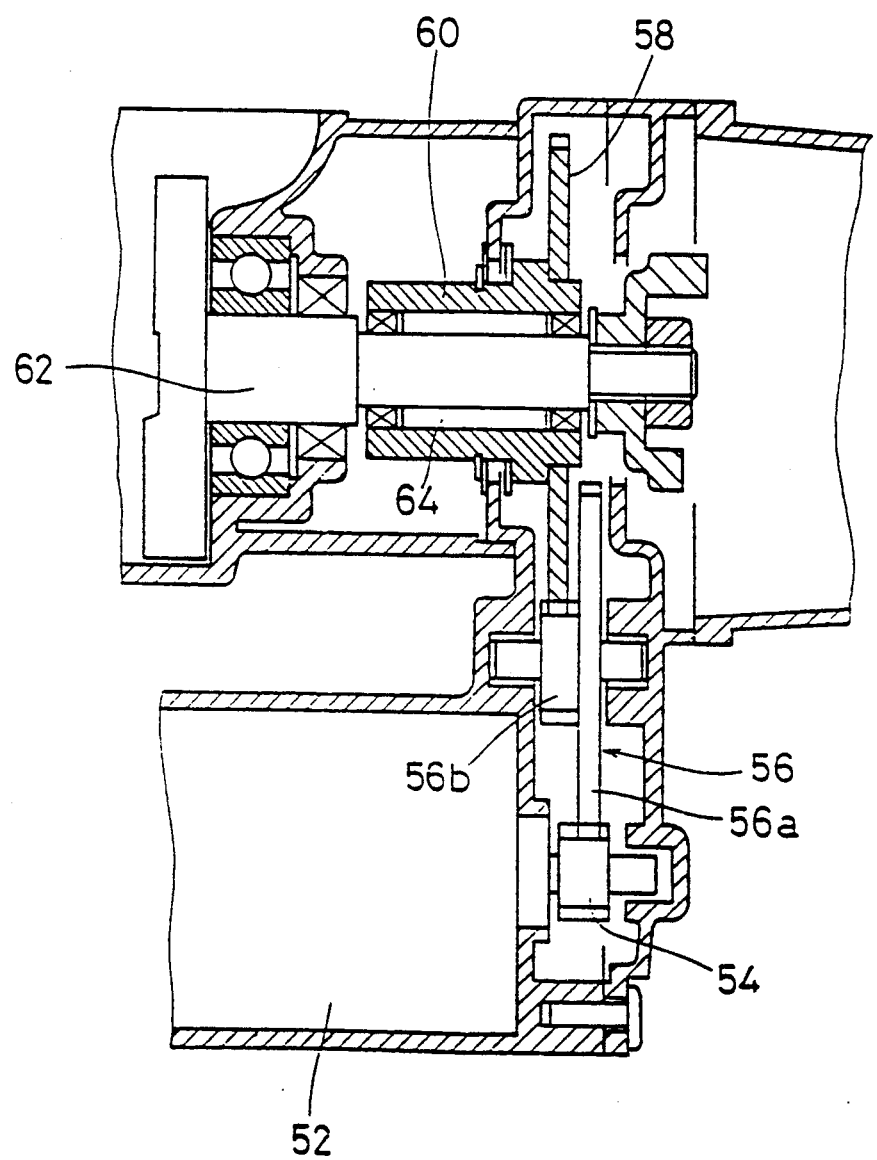
FIGS. 5 to 7 illustrate the prior art.
Figure 6:
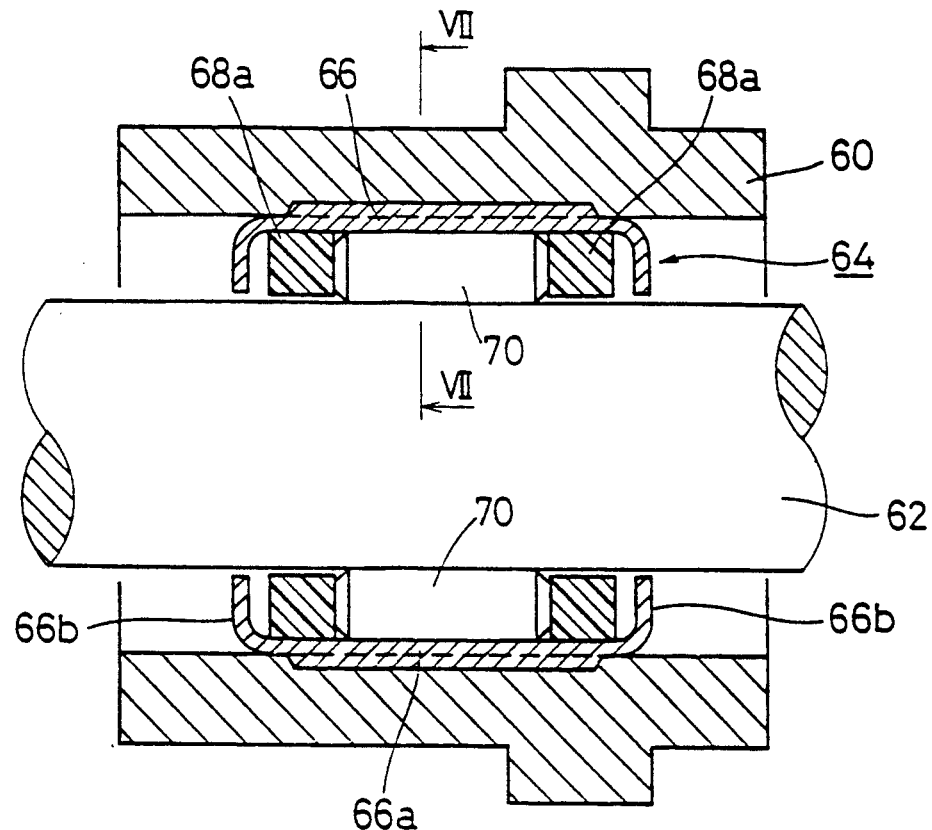
Figure 7:
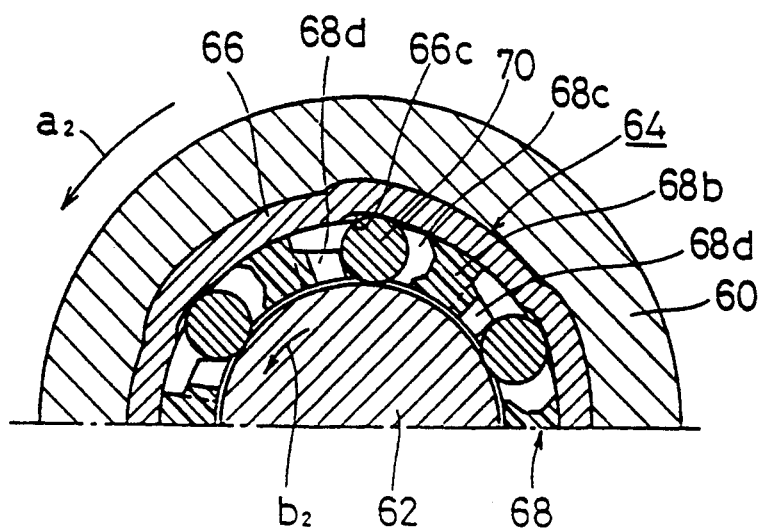

FIG. 4 is a side elevation, in longitudinal section, of a transmission system for use, for example, in an engine starter of an agricultural machine (lawn mower or sprayer). The transmission system includes an overrunning clutch and is disposed between a starter motor and a crankshaft (driven shaft).

Referring to FIG. 4, an engine casing 2, gear casings 4, 6, a motor housing 8 and a starter motor 10 are provided. A drive gear 12 is secured on the output shaft of the starter motor 10. An idle gearing 14 is composed of a large gear 14a and a small gear 14b integral with the large gear 14a. A a reduction gear 16 is secured on a cylindrical body or sleeve 18. The idle gearing 14 is journalled by the gear casings 4 and 6. The large gear 14a and the small gear of the idle gearing 14 are meshed with the drive gear 12 and the reduction gear 16, respectively. Power is transmitted from the motor 10 to the sleeve (drive shaft) 18 while the speed of rotation of the motor 10 is being reduced through these gears.

A crank 20, a crankshaft 22 and ball bearing 24 are provided. Through ball bearing 24, the crankshaft 22 is rotatably supported within the engine 2. Numeral 26 is a bearing seal. The crankshaft 22 has a reduced diameter portion 22a at one end. A step 22b is formed between the reduced diameter portion 22a and the body of the crankshaft 22. The crankshaft 22 has splines 22c which extend axially from the step 22b toward the crank. An annular groove 22d is formed in the reduced diameter portion 22a of the crankshaft and is spaced a predetermined distance away from the step 22b. The reduced diameter portion 22a has a threaded end 22e.

Figure 1:
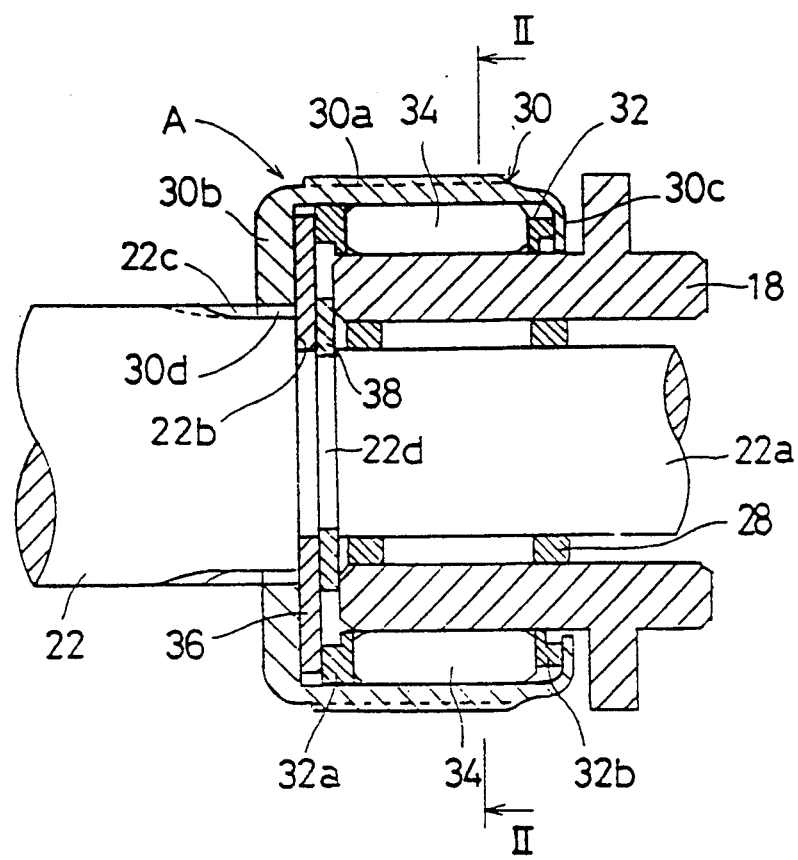
FIGS. 1 to 4 illustrate one embodiment of the present invention.
Figure 2:
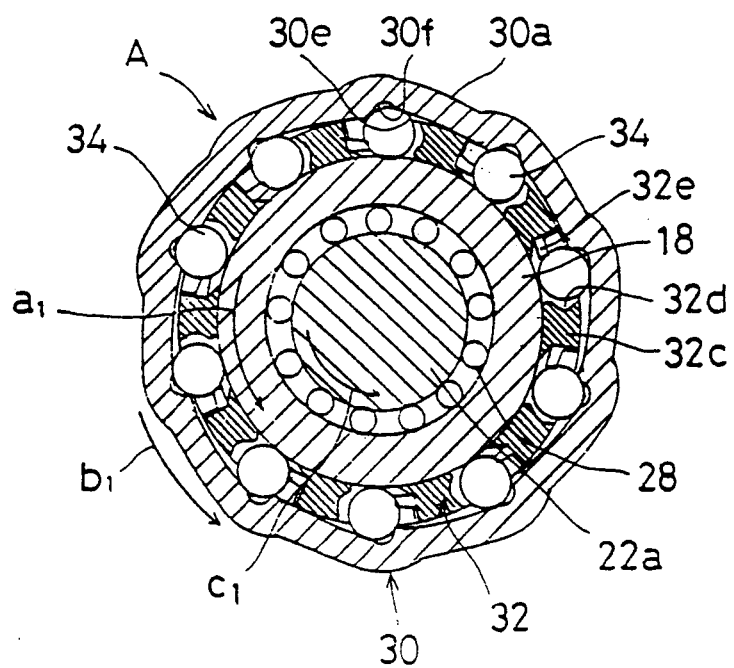

The sleeve 18 is rotatably supported on the reduced diameter portion 22a through a needle bearing 28. A one-way or overrunning clutch A extends between the sleeve 18 and the crankshaft 22. The overrunning clutch A is fixed to the crankshaft 22 and is designed to transmit rotation only from the sleeve 18 to the crankshaft 22. This overrunning clutch A is constructed as shown in FIGS. 1 and 2. FIGS. 1 and 2 are side and front views, in section, of the overrunning clutch, respectively.

The overrunning clutch A includes a shell (cylindrical body) 30, a retainer 32, a plurality of rollers 34, an annular abutment plate 36, and fixing member (C-shaped spacer) 38.

The shell 30 has a cylindrical portion 30a, and thick and thin flanges 30b and 30c extending radially and inwardly from opposite ends of the cylindrical portion 30a. Splines 30d are formed on the inner peripheral surface of the thick flange 30b to fit in the splines 22c of the crankshaft.

Cam surfaces 30e are formed in the inner surface of the cylindrical portion 30a and correspond in number to the rollers 34. As shown, in enlarged section, in FIG. 3, a recess 30f is radially formed at one side of each cam surface 30e where the distance between the cam surface 30e and the sleeve 18 is wider. In this embodiment, the recess 30f has an arcuate surface of a radius of curvature smaller than the radius of the roller 34.

The retainer 32 is made of synthetic resin and includes a pair of opposite annular rings 32a and 32b, a plurality of column portions 32c extending between the rings 32a and 32b, roller pockets 32d defined between adjacent column portions 32c, and springs 32e, in the form of bifurcated tongues, adapted to urge the rollers 34 rollable within the roller pockets 32d in the direction in which the rollers 34 are locked. The roller pockets 32d correspond in number to the cam surfaces 30e. The retainer 32 is fit in the shell 30.

The annular abutment plate 36 is inserted for abutment with the inner surface of the thick flange 30b and the annular ring 32a of the retainer 32. The retainer 32 is fit within the cylindrical portion 30a of the shell. The annular ring 32b is inserted for abutment with the thin flange 30c. The column portions 32c are secured to the inner surface of the cylindrical portion 30a.

The thick flange 30b of the shell 30 is fit around the crankshaft 20 with the splines 30e being engaged with the splines 22c. The annular abutment plate 36 is fit around the step 22b of the crankshaft 22. The spacer 38 is fit in the annular groove 22d of the crankshaft 22 so as to sandwich the abutment plate 36 between the spacer 38 and the step 22b. Thus, the overrunning clutch A is held on the crankshaft 22 in a cantilever fashion.

The area of contact between the abutment plate 36 and the thick flange 30b is relatively large, and the abutment plate 36 is in close contact with the thick flange 30b and the annular ring 32a. By this arrangement, the overrunning clutch A is firmly secured onto the crankshaft 22, while the rollers 34 are held in parallel to the crankshaft 22.

After the overrunning clutch A has been fixedly mounted to the crankshaft 22, the needle bearing 28 is fit around the reduced diameter portion 22a. The transmission sleeve 18, together with the reduction gear 16, is inserted between the needle bearing 28 and the rollers 34 of the overrunning clutch A. Finally, a washer 40 is fit around the threaded end 22e of the reduced diameter portion 22a. A wing nut 42 and a lock nut 44 are threadably engaged with the threaded end 22e to prevent release of the transmission sleeve 18.

The operation of the transmission system with the overrunning clutch A thus constructed is as follows.

To start up an engine, the motor 10 is energized to rotate the sleeve 18 in the direction of an arrow $a_1$ through the drive gear 12, the idle gearing 14 and the reduction gear 16. The rollers 34 are then locked between the cam surfaces 30e and the outer peripheral surface of the sleeve 18. This allows transmission of rotation from the sleeve 18 to the shell 30 through the rollers 34. The shell 30 is then rotated in the direction of an arrow $b_1$.

As the splines 30d of the thick flange 30b of the shell 30 are engaged with the spline 22c of the crankshaft 22, rotation of the shell 30 is transmitted to the crankshaft 22. The crankshaft 22 is then rotated in the direction of an arrow $c_1$ so as to start up the engine. At this time, the retainer 32, the rollers 34, the abutment plate 36, and the spacer 38 are all rotated together.

Although the motor 10 is deenergized after the engine has been started, the crankshaft 22 is rotated at a high speed in the direction of the arrow $c_1$ by the engine. Also, the shell 30, the retainer 32, the rollers 34, the abutment plate 36, the spacer 38 are rotated at a high speed in the direction of the arrow $b_1$. However, the sleeve 18 is stopped as it is connected through the reduction gear 16, the idle gearing 14, and the drive gear 12 to the motor 10 now stopped.

Figure 3:
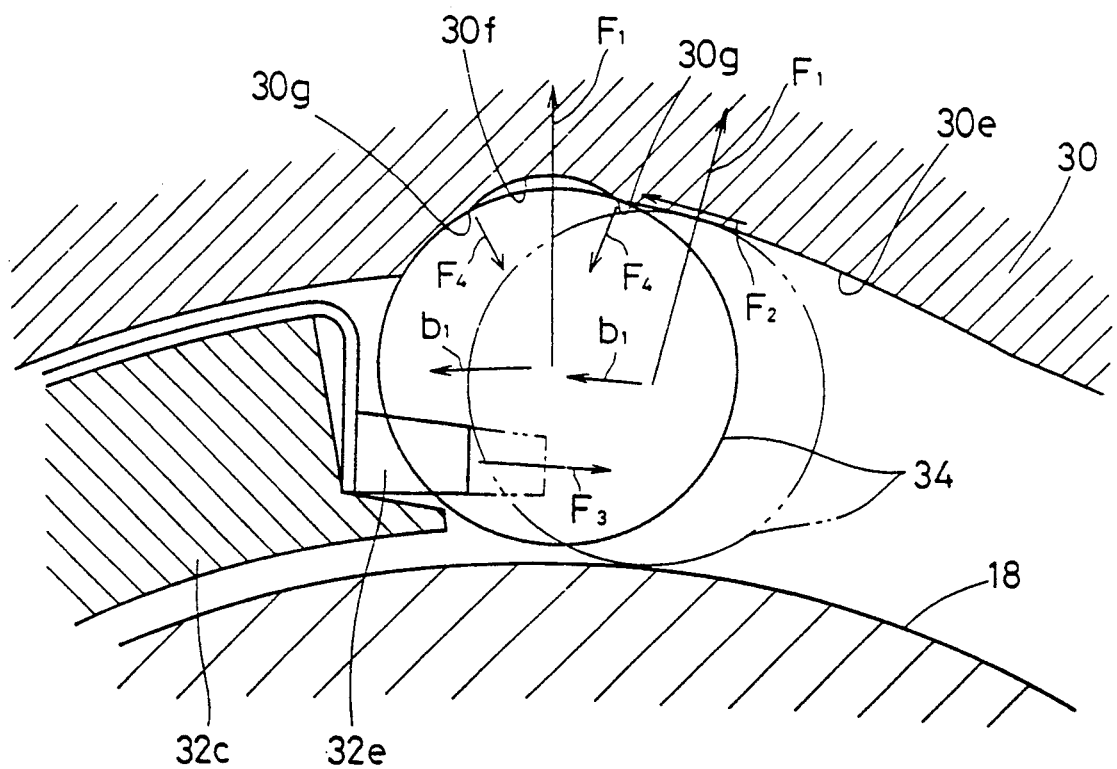

As shown in FIG. 3, a centrifugal force $F_1$ is produced when the roller 34 is rotated at a high speed in the direction of the arrow $b_1$. A component $F_2$ is then applied to the roller 34 along the cam surface 30e. This causes the roller 34 then contacted with the cam surface 30e to move in the direction in which the rollers 34 are free to race. The recess 30f has a radius of curvature smaller than the radius of the roller 34. By this arrangement, the roller 34 is firmly contacted with two opposite edges or points 30g of the recess 30f.

The roller 34 is subject to not only the centrifugal force $F_1$, but reaction forces $F_4$ from the edges 30g of the recess 30f as well. This produces a frictional force between the edges 30g of the recess and the roller 34. Although the action $F_3$ of the spring 32e increases as the roller 34 is moved toward the recess 30f, such a frictional force overcomes the action of the spring 32e so as to firmly hold the roller 34 in the recess 30f. Thus, the roller 34 is in no way moved between a position where it is free to race and a position where it is locked. This prevents the so-called "dancing phenomenon" of the rollers 34.

Since the rollers 34 can be separated from the outer peripheral surface of the sleeve 18, rotation of the crankshaft 22 and the shell 30 is in no way transmitted to the sleeve 18 and thus, the starter motor 10.

As is clear from the foregoing, no frictional force is applied to the rollers 34 which is held against the recesses 30f and separated from the outer peripheral surface of the sleeve 18. This prevents undue wear and consequent increase in the temperature of the rollers 34 and allows smooth rotation of the crankshaft 22.

When the crankshaft 22 is stopped or the speed of rotation of the crankshaft 22 is substantially reduced, the centrifugal force $F_1$ is no longer applied to the rollers 34. Each roller 34 is then moved away from the recess 30f under the action $F_3$ of the spring 32e and locked between the sleeve 18 and the shell 30.

In the illustrated embodiment, the recess 30f has an arcuate surface, the radius of curvature of which is smaller than the radius of the roller 34. The shape and size of the recess 30f are not limited thereto provided that the recess has two edges or points against which the roller 34 is held. Also, the recess may have the same radius as the roller 34 provided that approximately one third of the entire circumference of the roller 34 is received in the recess.

With the present invention thus far described, when a centrifugal force is applied to the rollers upon rotation of the driven shaft together with the shell and the retainer, the rollers are urged in the direction in which they are free to race and then, engaged with the recesses. This firmly holds the rollers in such a position that they are free to race regardless of an increase in the biasing force of the springs. Therefore, the rollers are no longer moved between a position where they are free to race and a position where they are locked, or the so-called "dancing phenomenon" can be eliminated. The rollers are prevented from being worn or hot which may results from intermittent contact with the outer peripheral surface of the drive shaft. Also, the driver shaft can smoothly be rotated.

The springs need not provide an extremely small biasing force, but provides a force only sufficient to urge the rollers in the direction in which they are locked so as to transmit rotation of the drive shaft to the driven shaft.

The recess has a radius of curvature smaller than the radius of the roller, and the roller is held at opposite edges or two points of the recess. This arrangement more firmly holds the rollers in the recesses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An overrunning clutch comprising:
   a rotatable drive shaft;
   a driven shaft coaxial with said drive shaft;
   a cylindrical body secured to and coaxial with said driven shaft, said cylindrical body being arranged to surround a transmission section of the drive shaft and being rotatable therewith, the cylindrical body including a plurality of cam surfaces formed in an inner peripheral surface thereof and acting as an overrunning clutch;
   recesses radially formed in the corresponding cam surfaces for holding rollers against the action of springs, each of the recesses having a forward edge and a rearward edge with an arcuate surface therebetween;
   a retainer held within said cylindrical body and including a plurality of roller pockets corresponding to said cam surfaces;
   a plurality of rollers rollingly disposed within the corresponding roller pockets and contractible with the inner peripheral surface of said cylindrical body and the peripheral surface of the transmission section of said drive shaft, each of the rollers having a radius which is larger than the radius of the corresponding recess, said rollers being movable out of contact with the peripheral surface of the transmission section when the cylindrical body stops rotating and the transmission section of the drive shaft rotates, the rollers engaging the forward and rearward edges of the corresponding recess when the rollers are out of contact with the peripheral surface of the transmission section; and
   springs disposed within said roller pockets for urging said rollers in a direction in which said rollers are locked in the cam surfaces.

2. The overrunning clutch according to claim 1, wherein said retainer is made of synthetic resin, and said springs are integral with said retainer.

3. The overrunning clutch according to claim 1, wherein said overrunning clutch is in an engine starter, and wherein said driven shaft is a crankshaft of the engine.

* * * * *